United States Patent
Cavallerano et al.

(10) Patent No.: US 6,320,623 B1
(45) Date of Patent: Nov. 20, 2001

(54) METHOD AND DEVICE FOR DETECTING AN EVENT IN A PROGRAM OF A VIDEO AND/OR AUDIO SIGNAL AND FOR PROVIDING THE PROGRAM TO A DISPLAY UPON DETECTION OF THE EVENT

(75) Inventors: Alan P. Cavallerano, White Plains, NY (US); Richard C. Shen, Leonia, NJ (US); Claudio Ciacci, White Plains, NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/191,598

(22) Filed: Nov. 13, 1998

(51) Int. Cl.⁷ .................................................. H04N 5/445
(52) U.S. Cl. ...................... 348/553; 348/423.1; 348/564; 348/568; 348/569
(58) Field of Search ..................................... 348/563, 564, 348/565, 566, 567, 568, 569, 570, 906, 468, 462, 461, 84, 125, 423.1, 700; 382/141; 704/259; 364/507; 340/425.06, 425.16; 395/2.68; 324/512

(56) References Cited

U.S. PATENT DOCUMENTS

| | | | |
|---|---|---|---|
| 4,230,990 | 10/1980 | Lert, Jr. et al. | 455/67 |
| 5,585,865 | * 12/1996 | Amano et al. | 348/731 |
| 5,585,866 | * 12/1996 | Miller et al. | 348/731 |
| 5,610,664 | * 3/1997 | Bobert | 348/564 |
| 5,701,161 | * 12/1997 | Williams et al. | 348/468 |
| 5,710,600 | * 1/1998 | Ishii et al. | 348/563 |
| 5,751,371 | * 5/1998 | Shintani | 348/564 |
| 5,812,209 | * 9/1998 | Nishigaki | 348/553 |
| 5,838,384 | * 11/1998 | Schindler | 348/563 |
| 5,850,218 | * 12/1998 | Lajoie | 348/13 |
| 5,880,789 | * 3/1999 | Inaba | 348/468 |
| 5,907,793 | * 5/1999 | Reams | 348/7 |

FOREIGN PATENT DOCUMENTS

| | | |
|---|---|---|
| 0912053A1 | 4/1999 | (EP) . |
| 9627840A1 | 9/1996 | (WO) . |

* cited by examiner

Primary Examiner—Matthew Luu
Assistant Examiner—Wesner Sajous
(74) Attorney, Agent, or Firm—Laurie E. Gathman

(57) ABSTRACT

A device for automatically providing program information to a television display upon detection of an event in the program. The event being a user definable event. The device also provides automatic PIP display of the program having the event and a delay of the event so that it is not missed by the viewer.

3 Claims, 5 Drawing Sheets

US 6,320,623 B1

METHOD AND DEVICE FOR DETECTING AN EVENT IN A PROGRAM OF A VIDEO AND/ OR AUDIO SIGNAL AND FOR PROVIDING THE PROGRAM TO A DISPLAY UPON DETECTION OF THE EVENT

FIELD OF THE INVENTION

The present invention relates in general to television receivers and in particular to a device which receives video and/or audio material and automatically displays in the picture in-picture (PIP) a particular program based on some event occurring in the program.

BACKGROUND OF THE INVENTION

A television feature called PIP allows a television viewer to view a main television program while monitoring (typically in a small "window") another PIP program. When an exciting event occurs in the PIP program, the viewer can swap the program being viewed in the main display with the program being viewed in the PIP. The problems with such a system are that the viewer cannot monitor the audio information in the PIP, and in addition the PIP occupies a portion of the main display which is quite annoying to a viewer watching on the program information in the main display.

For viewers without PIP, many will switch from a favorite channel to another channel while waiting for some event to occur on the favorite channel. It is typical, for example, for a viewer to switch back and forth between a football game and some other programming while there is little action in the football game, but many times a touchdown is missed without the viewer even knowing it.

In previously known television receiving devices aimed at solving these problems, such as that disclosed in U.S. Pat. No. 5,585,865, the televisions monitor the program content of a channel by relying on additional data which is transmitted with a television signal, such as the data received from the Extended Data Service (EDS). In this prior art television receiver a user selects a particular genre of programming that he/she would like to view such as "Sports". The EDS data is then extracted from the incoming video signals and compared to the genre selected by the viewer. If a match is found on a particular channel the television tuner is switched to this channel.

The problems associated with such a system is that it requires "program type" data, which indicates the type of program e.g."Sports" "Movie" "News" etc.), to be transmitted in addition to the video signal. The user therefore must rely on the broadcasters to agree to transmit such "program type" data. Even if there is an agreement among broadcasters to transmit this data, such a monitoring system does not permit a user to monitor data on a user defined basis and more importantly the user cannot monitor events occurring in the video signal or in the audio signal but only events occurring in the EDS data. In particular the user cannot monitor information occurring within the program such as when a favorite sports figure's name is mentioned during a program, whether it is during a sporting event or simply on the news. Similarly, it is known to detect header information in the transmitted signal for various purposes, but to date a user has been unable to define what information the user would like to detect in the video signal or audio signal.

SUMMARY OF THE INVENTION

Accordingly, it is an object of the invention to provide a television receiver and method of detecting particular events occurring in a video and/or audio signal and automatically providing a program having the event to the television receiver upon the detection of the particular event.

It is another object of the invention to automatically provide in a PIP window the program having the detected event, even if the PIP window is not originally being displayed. This enables the viewer to quickly swap the main display with the PIP window if the user wishes to view the PIP program.

It is another object of the invention to detect a particular event occurring in another program, store the frames making up the event in a memory to thereby capture the event missed by the viewer, and then display the event either as a PIP window or a main window but delayed by the memory.

It is yet another object of the invention to detect an event by monitoring the audio signal of a program using speech recognition technology.

It is even a further object of the invention to detect text occurring in a program using text recognition technology.

It is yet even another object of the invention to provide the viewer with the ability to enter a particular word or sound (such as the crowd's roar) as the event to be detected.

It is yet a further object of the invention to monitor the video for a particular shape such as a weather map or a football.

It is yet even another object of the invention to enable a viewer to surf the web (e.g. using a WebTV) while monitoring in the background video/audio program information for an exciting event. Similarly a viewer can monitor video/audio information while using a word processing program on a PC equipped with a tuner.

The invention accordingly comprises the methods and features of construction, combination of elements, and arrangement of parts which will be exemplified in the construction hereinafter set forth, and the scope of the invention will be indicated in the claims.

BRIEF DESCRIPTION OF THE DRAWINGS

For a better understanding of the invention reference is made to the following drawings.

DETAILED DESCRIPTION OF THE PREFERRED EMBODIMENT

Figure 1:
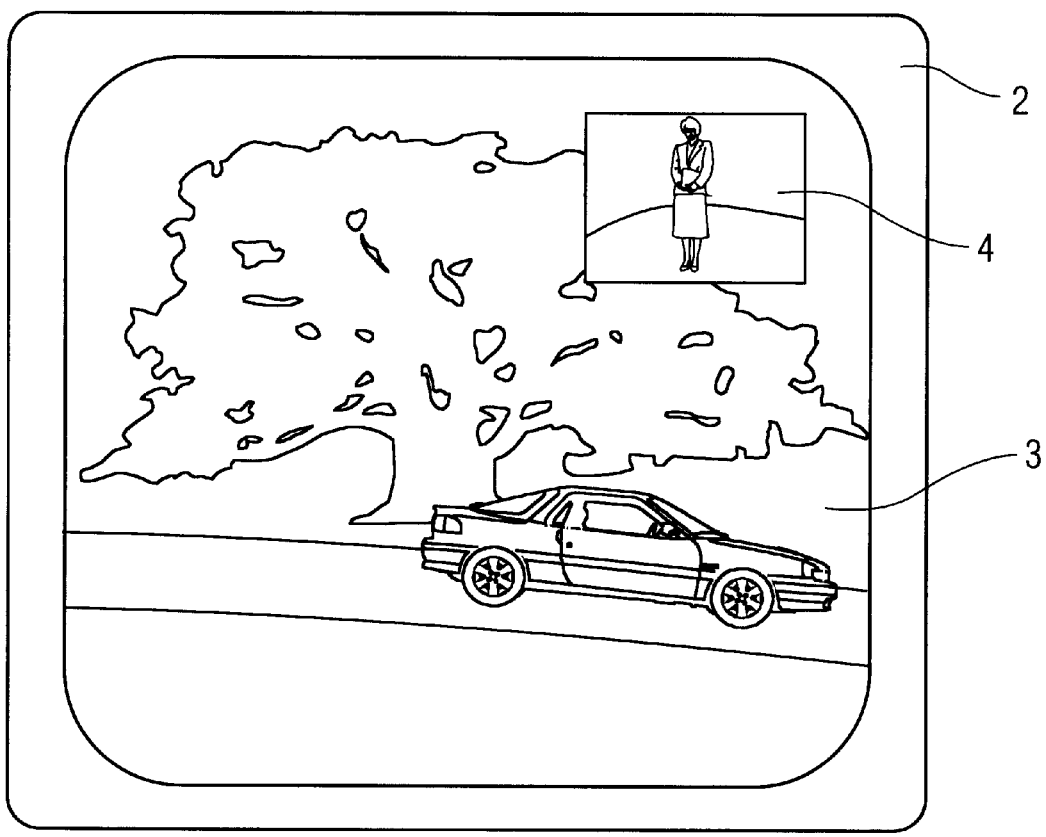
FIG. 1 shows a television receiver having a PIP.
Figure 2:
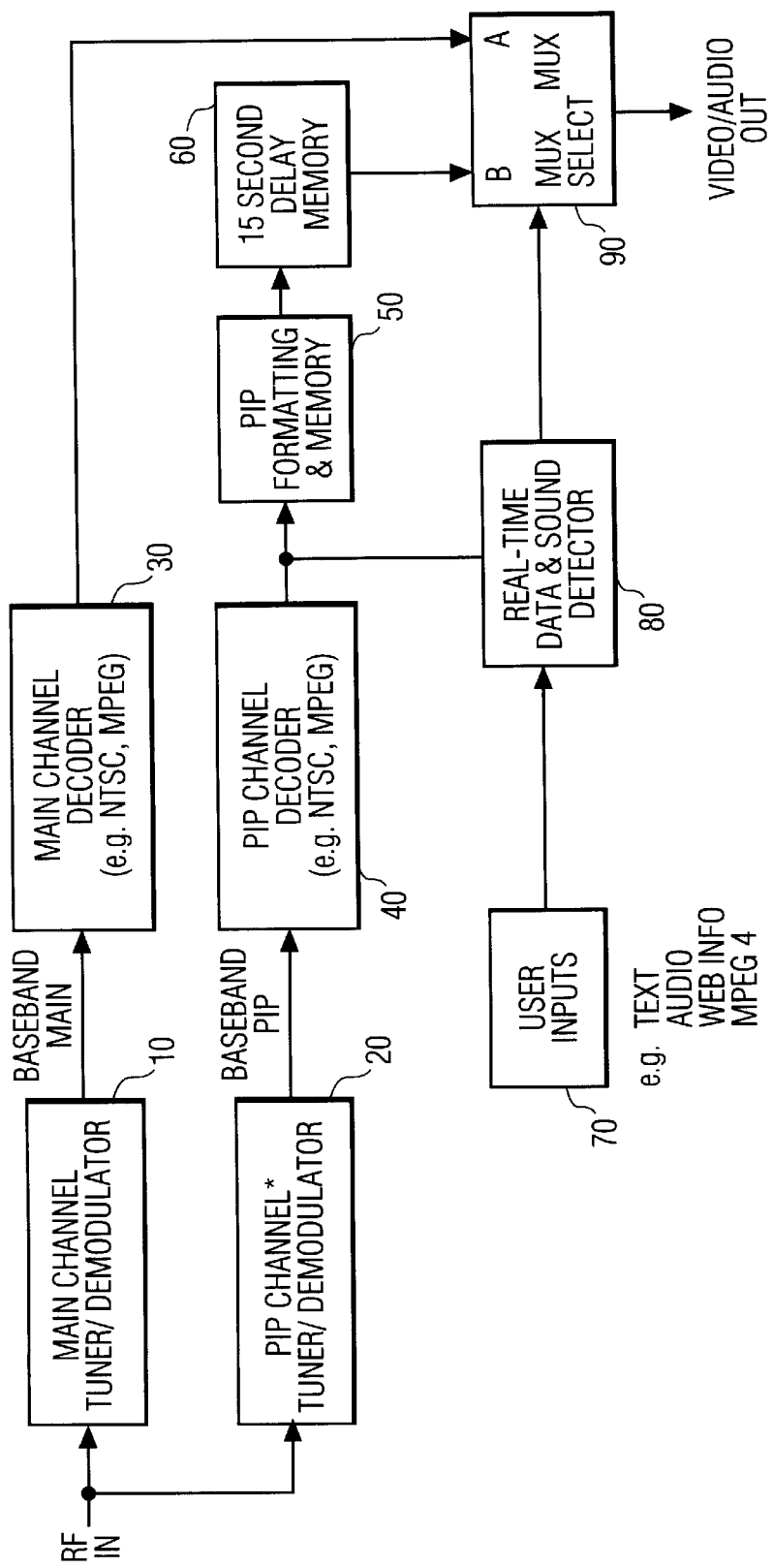
FIG. 2 shows a block diagram of a smart PIP in accordance with a preferred embodiment of the invention.

FIG. 1 shows a television set 2 with a main display 3 and a PIP display 4. FIG. 2 is a block diagram of a smart PIP system wherein instead of the PIP being either ON or OFF, the PIP device is operating in the background searching for a predefined condition or event. When the predefined condition or event is found then the PIP window is turned ON. The specific operation of such a preferred embodiment is explained with reference to FIG. 2.

The main channel tuner demodulator 10 receives the RF video and/or audio information of a plurality of programs and tunes into a particular program. The main channel decoder 30 decodes the digital video and/or audio information of the particular program and supplies the decoded video and/or audio to the 'a' input of multiplexer 90.

The PIP channel tuner/demodulator 20 receives the RF video and/or audio information of a plurality of programs and tunes into a particular program for display in the PIP. The digital PIP program is then decoded in the PIP channel decoder 40. The PIP formatting and memory 50 formats the video information of the PIP program for the smaller PIP display. The delay memory 60 stores the formatted PIP program for a predetermined period of time which operates as a delay of the video information. The delayed formatted video is supplied to the 'b' input of multiplexer 90.

The user inputs, at the user interface 70, the particular event to be detected in the PIP program such as text, audio, web information, etc. The real-time data and sound detector 80 analyzes the PIP program information for the particular event. Once the event is detected the select line of the multiplexer 90 is activated and causes the PIP program having the detected event to be displayed, delayed by a predetermined amount of time, in a PIP.

In an alternative embodiment of the invention, the program having the detected event is displayed in the main display rather than the PIP display. In such an embodiment, either there is a single tuner 20 or there is no PIP formatting memory 50.

In addition, the system is capable of monitoring several programs for the particular event by just increasing the number of tuners available. The program having the detected event is then displayed in the PIP.

The real time data and sound detector 80 could be any well known speech recognition circuitry, such as the Philips Free Speech technology. In a preferred embodiment of the invention, the user monitors the program information for a word or phrase selected from a predefined vocabulary list of terms or phrases. This will greatly improve the accuracy of the speech recognition technology. Such words may include: touchdown, score, President, weather, New York Stock Exchange, Dow, Yankees, etc. A menu is easily provided on-screen which contains the vocabulary list. Alternatively instead of a predefined vocabulary list, the viewer uses an on-screen keyboard which enables the viewer to type in text corresponding to a word the user wishes to detect, e.g. Mike Piazza, Matt Lauer, Barney, etc.

Alternatively, or in combination, the data and sound detector includes text recognition circuitry for scanning the video information for text within the frames of video. Each frame of video is received in the form of a bitmap and software such as the Zerox Text Bridge Pro or PAGIS Pro can be used to search the bit map images for text. It can also be envisioned where future televisions display web site information and this web site information is detected within the video using some form of text recognition such as those mentioned above or text recognition that recognizes Java.

Figure 4:
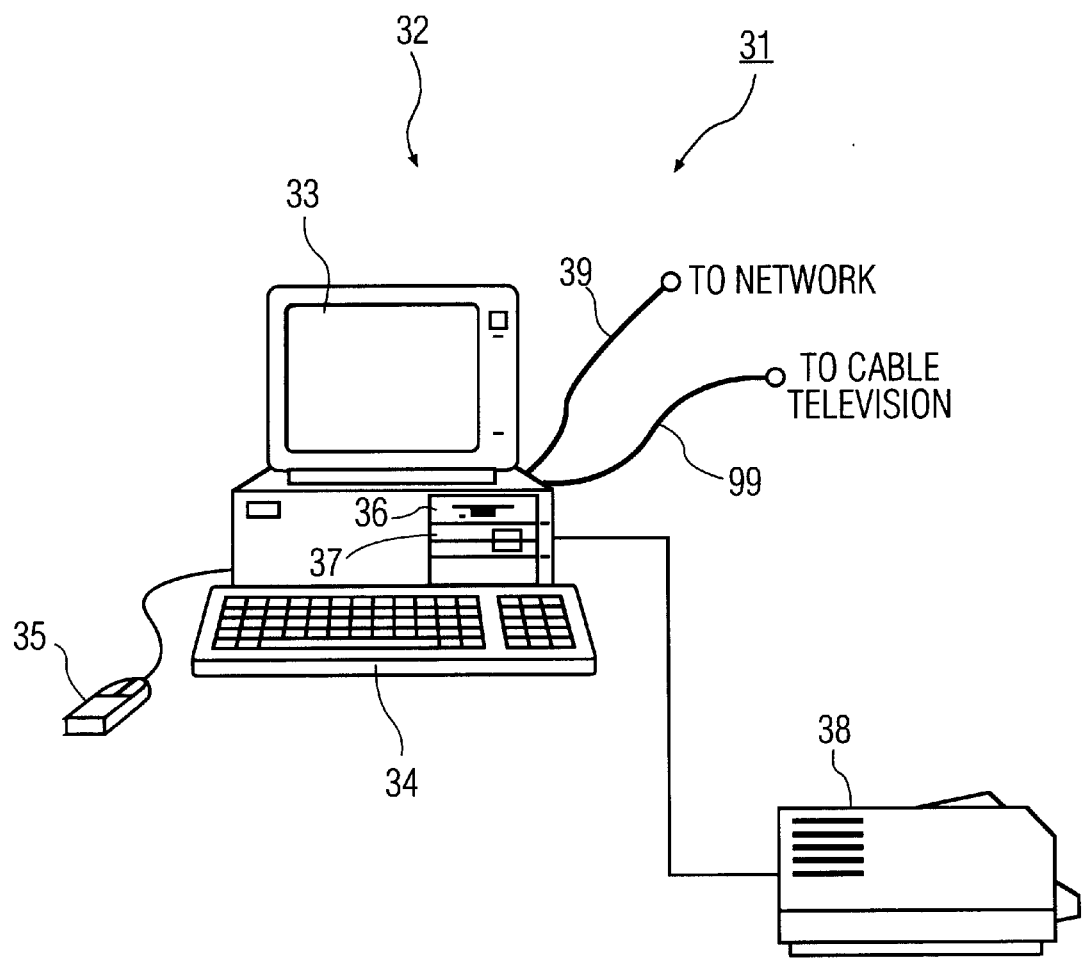
FIG. 4 shows a PC configured for the present invention.
Figure 5:
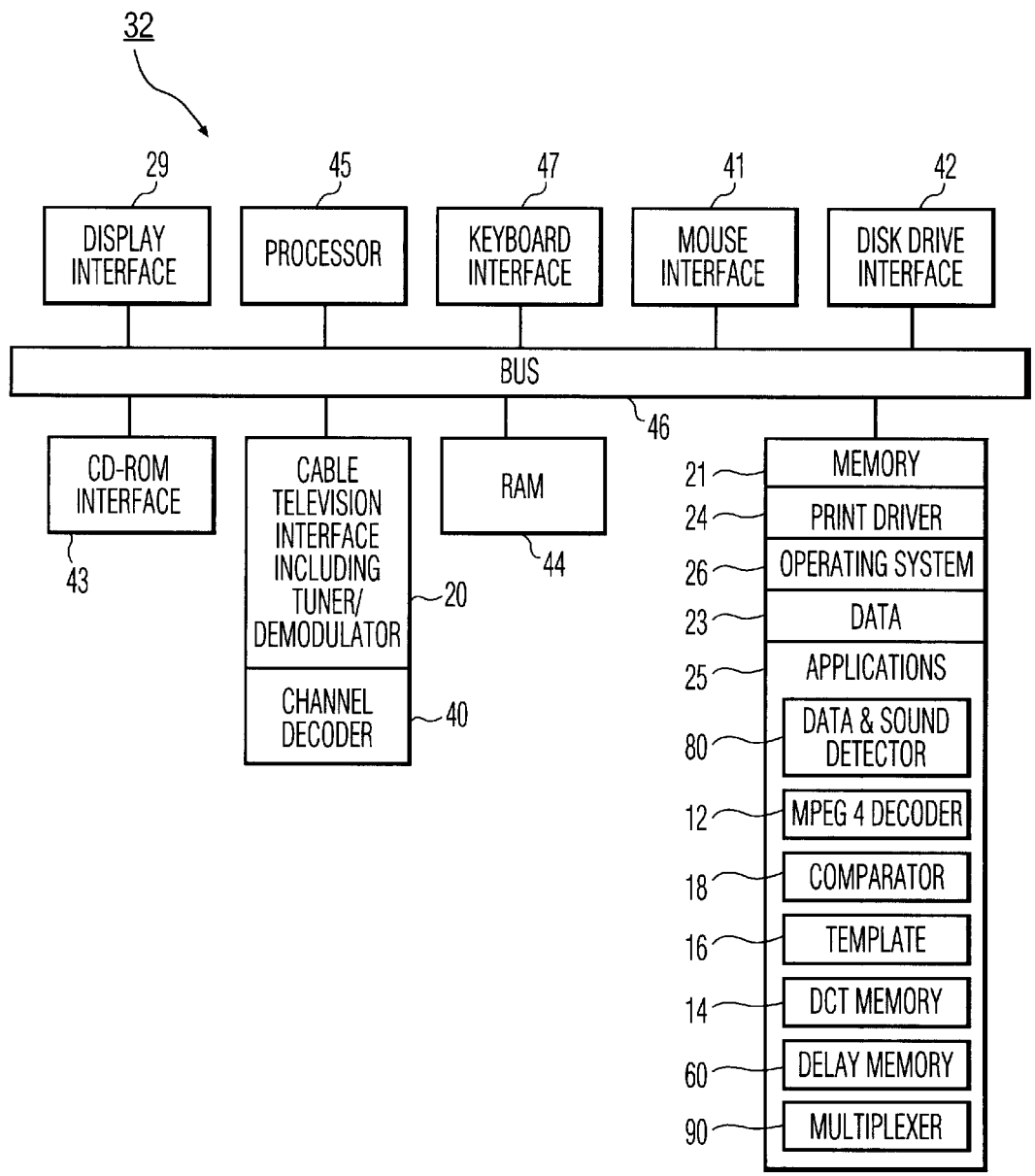
FIG. 5 shows the internal structure of the PC in FIG. 4.

In another application of the invention the PC shown in FIGS. 4 and 5 includes a tuner. Software is provided which monitors the program information for a particular event and either, upon detection, provides the program to the monitor or to a window on the monitor. Similarly it is common for a user to have in her den a web browser attached to the television. In such a situation it is practical to have some type of background monitoring of the program information being performed for one member of the family while another member of the family is surfing the web.

Figure 3:
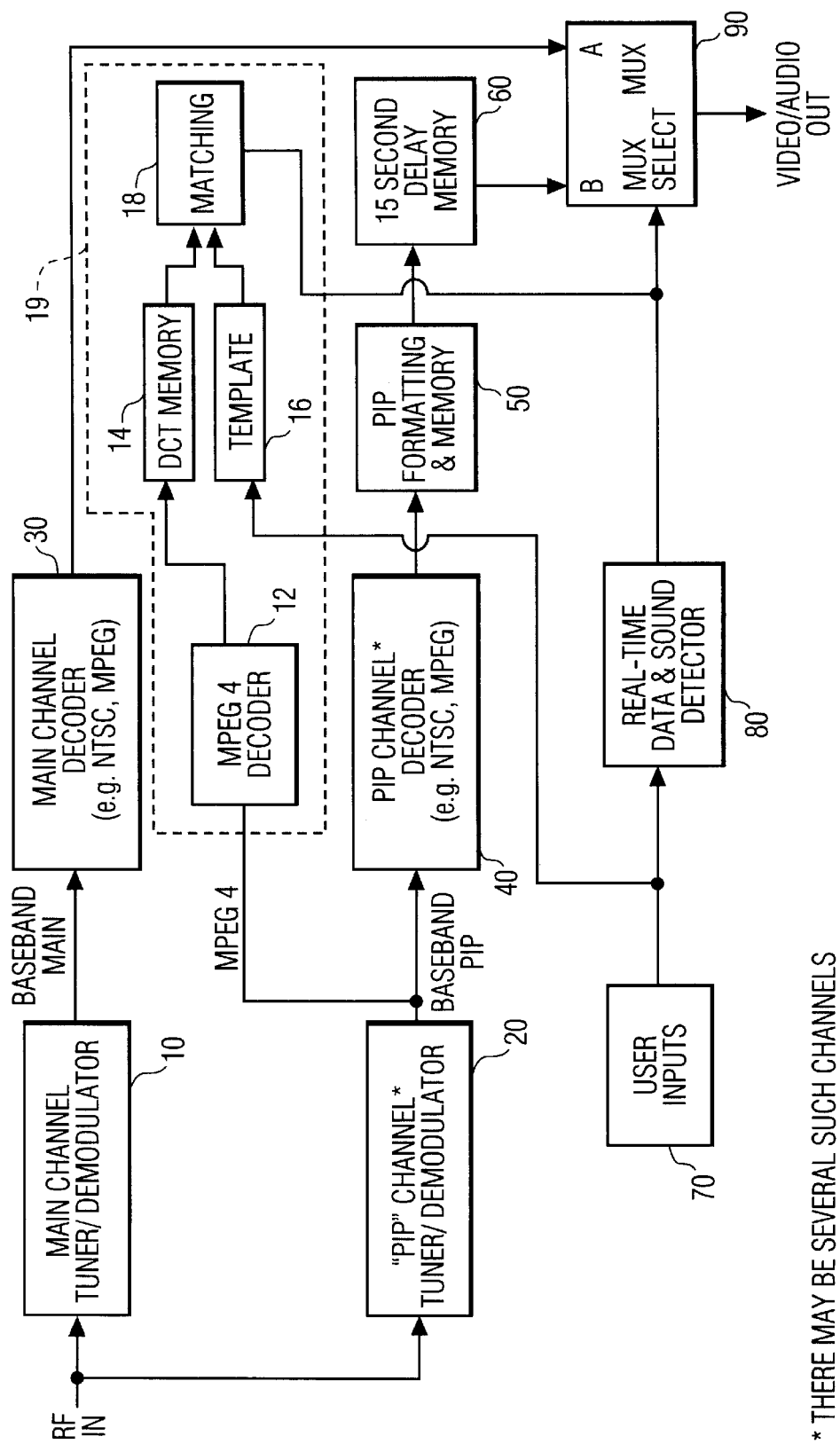
FIG. 3 shows a block diagram of a smart PIP and a shape detector in accordance with a preferred embodiment of the invention.

Furthermore, with the superior capability available for analyzing the video content of a digitally encoded program, a particular shape can be easily located with the instant invention. FIG. 3 shows a modification of FIG. 2 with shape detection circuitry 19. All broadcasters may be required to broadcast MPEG-4 video information along with the broadcast signal. MPEG-4 is an encoding scheme used for transmitting video in low bandwidth networks. It enables a broadcaster to send program information to anyone, whether the receiver is a hand-held device having a very low resolution monitor and a low bandwidth connection to the broadcaster's signal or an HDTV receiver having a high resolution monitor and high bandwidth connection to the broadcaster. MPEG-4 uses object type coding where objects are identified in the video and a code for the particular object is transmitted rather than the detail of the specific object. For example, instead of coding a brick house by encoding all of the detail in each brick, MPEG-4 sends a code which indicates that the house is brick and the receiver fills in the house with a brick from a template. Similarly if a football is being encoded, MPEG-4 sends a shape code of an oval and motion vectors of where the oval is placed in the background. The output of MPEG-4 is a spectrum of DCT coefficients. Depending on the object being transmitted the pattern of the DCT coefficients will vary.

In a preferred embodiment of the invention there is a template 16 of object patterns stored in the receiver. These patterns are in the form of DCT coefficients. Each object has a specific DCT coefficient pattern associated with it. The receiver stores a list of objects available to the viewer. The user can display the list of objects on-screen for easy selection. The user selects a particular object and the DCT coefficient pattern of this object is selected. The MPEG-4 signal is extracted from the baseband signal and MPEG-4 decoded at 12. The DCT coefficients of the incoming video are provided to DCT memory 14. A comparator 18 compares the template pattern 16 to the incoming DCT coefficient patterns 14. Once a template DCT coefficient pattern matches the incoming DCT coefficient pattern the multiplexer 90 is activated via the mux select and the frames stored in the 15 second delay memory 60 are provided to the PIP. This 15 second delay ensures that the user does not miss the event before it is displayed.

FIG. 4 shows a representative embodiment of a computer system 31 on which the present invention may be implemented. As shown in FIG. 4, personal computer ("PC") 32 includes network connection 39 for interfacing to a network, such as a variable-bandwidth network or the Internet, and cable television connection 12 for interfacing with other remote sources such as a coaxial cable television line. PC 32 also includes display screen 33 for displaying information (including video data) to a user, keyboard 34 for inputting text and user commands, mouse 35 for positioning a cursor on display screen 33 and for inputting user commands, disk drive 36 for reading from and writing to floppy disks installed therein, and CD-ROM drive 37 for accessing information stored on CD-ROM. PC 32 may also have one or more peripheral devices attached thereto, such as a video conference camera for inputting images, or the like, and printer 38 for outputting images, text, or the like.

FIG. 5 shows the internal structure of PC 32 As shown in FIG. 5, PC 32 includes memory 21, which comprises a computer-readable medium such as a computer hard disk. Memory 21 stores data 23, applications 25, print driver 24, and operating system 26. In preferred embodiments of the invention, operating system 26 is a windowing operating system, such as Microsoft® Windows95; although the invention may be used with other operating systems as well. Among the applications stored in memory 21 are channel decoder 40, data and sound detector 12, comparator 18, template 16, DCT memory 14, delay memory 60 and multiplexer 90.

Also included in PC 10 are display interface 29, keyboard interface 47, mouse interface 31, disk drive interface 42, CD-ROM drive interface 43, computer bus 46, RAM 44, processor 45, and television interface tuner demodulator 20 and channel decoder 40. Processor 45 preferably comprises a microprocessor or the like for executing applications, such those noted above, out of RAM 44 Such applications may be stored in memory 21 (as noted above) or, alternatively, on a floppy disk in disk drive 36 or a CD-ROM in CD-ROM drive 37. Processor 45 accesses applications (or other data) stored on a floppy disk via disk drive interface 42 and accesses applications (or other data) stored on a CD-ROM via CD-ROM drive interface 43

Application execution and other tasks of PC 32 may be initiated using keyboard 34 or mouse 35, commands from which are transmitted to processor 45 via keyboard interface 47 and mouse interface 41, respectively. Output results from applications running on PC 32 may be processed by display interface 29 and then displayed to a user on display 33 or, alternatively, output via network connection 39. For example, input video data which has been received via cable television interface tuner demodulator 40 can be displayed by display 33. To this end, display interface 29 preferably comprises a display processor for forming video images based on decoded video data provided by processor 45 over computer bus 46 and for outputting those images to display 33. Output results from other applications, such as word processing programs, running on PC 32, may be provided to disk drive interface 42.

The user of the above described PC can work on a word processing program while monitoring a football game for a touchdown. Once a touchdown is detected, either via speech recognition, text recognition or shape recognition, the football game is automatically provided to the display 33.

It will thus be seen that the objects set forth above, and those made apparent from the preceding description are efficiently obtained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

What is claimed is:

1. Computer-executable process steps stored on a computer-readable medium, the computer-executable process steps to detect a shape in a video signal including a plurality of different programs and including an MPEG-4 video signal, the computer executable process steps comprising:

a first receiving step to receive the video signal;

a second receiving step to receive the MPEG-4 video signal;

a first decoding step to decode the video signal;

a second decoding step to decode the MPEG-4 video signal;

a third receiving step to receive an input from a user defining a shape to be detected in at least one program of the decoded video signal;

a detecting step for detecting the shape in the decoded MPEG-4 video signal; and a providing step to automatically provide to a display the program having the detected shape.

2. The computer-executable process steps as claimed in claim 1, further including a delay step to delay the program having the detected shape so that display of the program captures the detected shape.

3. An apparatus for detecting a shape in a video signal comprising a plurality of programs, the apparatus comprising:

a memory which stores process steps; and a processor which executes the process steps stored in the memory so as (i) to detect, in an MPEG-4 video signal, a shape which as been selected by a user, and (ii) to output automatically to a display upon detection of the shape the program containing the shape.

\* \* \* \* \*